Sept. 15, 1953 W. E. RUPP 2,652,181
PUMPING APPARATUS AND METHOD OF PUMPING FLUIDS
Filed March 14, 1947 3 Sheets-Sheet 1

Fig. 1

INVENTOR.
Warren E. Rupp
BY
ATTORNEY.

Patented Sept. 15, 1953

2,652,181

UNITED STATES PATENT OFFICE 2,652,181

PUMPING APPARATUS AND METHOD OF PUMPING FLUIDS

Warren E. Rupp, Mansfield, Ohio, assignor to The Gorman-Rupp Company, Mansfield, Ohio, a corporation of Ohio Application March 14, 1947, Serial No. 734,610

9 Claims. (Cl. 226—20.8)

This invention relates to a pumping apparatus or system and a method of pumping fluids. The invention as an entire system and method has a variety of industrial applications and also includes subcombinations of elements of general application to a number of uses. The apparatus when connected to a tire or other type of fluid container, provides a complete self-contained fluid distributing unit or system requiring no outside source of fluid.

The invention finds an important field of particular utility in connection with the filling or weighting of tires for earth-moving equipment. It is well-known that a low center of gravity is of basic importance for earth-working apparatus and that liquid filled tires provide a very advantageous weight distribution for such equipment to insure greater traction and drawbar pull. Ordinarily, the filling of such tires with liquid involves the use of several different types of pumps and tank connections, with loss of time in making adjustments.

The present invention has in view providing a single apparatus or system adapted to take air or gas out of a receptacle, such as a tire or the like, compress the air and store it in a pressure tank over liquid, such as water, likewise under pressure, and by operating suitable controls, selectively, pump air or gas, or water or other liquid, between the tire or receptacle, and the pressure tank, in either direction, under accurately controlled conditions of high or low pressure.

As stated, the invention is of particular utility for weighting tires of earth-working equipment. It can be used to evacuate the air from the tire, followed by the filling of a predetermined amount of liquid into the space formerly occupied by such air, and finally by the addition of pressure air above the liquid to produce the operative characteristics as to weight and resiliency required of the tires for the particular apparatus being conditioned for use.

The invention includes the method of interchanging air between a tire and a pressure reservoir also containing water, which method includes the steps of moving a desired quantity of the air from the tire to the reservoir, then moving a portion of the water or other liquid from the reservoir to the tire, and thereafter moving some of the pressure air from the reservoir to a position above the liquid in the tire. Thus, the tire and the fluid reservoir and the associated operative parts, provide a complete self-contained system adapted to weight or condition a tire without drawing on an outside source of supply. The invention also provides the means for removing the liquid to repair or change tires, and thereafter restoring a proper amount of air under pressure within the tire.

The invention includes a liquid pump operable as a jet fluid pump in conjunction with a closed fluid pumping circuit including a fluid pressure tank, the fluid operated on by the pump comprising air moved in one stage in one direction, liquid moved in a succeeding stage in an opposite direction and air moved in a final stage opposite the first air stage direction.

The invention includes the pump circuit referred to in conjunction with valves and fluid connections, whereby economies of time and material and equipment are brought about through the interaction and balancing of the fluid elements handled in the pumping operation.

The invention includes the provision of a single self-contained unit having a power unit, such as a gas engine, or an electric motor, preferably directly connected with a centrifugal pump having self-priming characteristics, and preferably operating in conjunction with a closed liquid circuit including a jet nozzle and a fluid pressure tank, and adapted through control of its valves and connections to perform the steps above referred to, namely, to draw air from a tire of a tractor, earth-working vehicle or the like, and then to supply liquid into the evacuated tire and thereafter to add pressure air in a predetermined amount above such liquid.

The invention in one aspect provides a "feedback" of accumulated power, as the air or gas compressed within the pressure reservoir above the water level, provides high pressure liquid feed to the jet nozzle compressing the air and thus the air pressure is developed by means of the force of the centrifugal pump in addition to the force of the tank pressure on the liquid supply. The pump thus is effective as a multi-stage pump.

Another feature of the invention is found in the pressure reservoir serving to separate the air and the liquid supply. By connecting the liquid supply to the pumping unit above the liquid level on the intake side of the pump, the apparatus automatically retains a filled working chamber. When handling air, the liquid within the pumping circuit remains constant. When pumping liquid into the tire, the air and the jet nozzle are cut off. The said centrifugal pump then supplies liquid direct to and through the conduits for supply to the tire. However, in pumping liquid out of the tire the jet nozzle operates directly on the liquid, in a manner similar to its action in pumping air.

The various features referred to will be described in detail in connection with the description of the apparatus.

To the accomplishment of the foregoing and related ends, said invention consists of the means and method hereinafter fully described and particularly pointed out in the claims.

The annexed drawings and the following description set forth in detail certain means and methods of carrying out the invention, such disclosed means and modes illustrating, however, but several of various ways in which the principle of the invention may be used.

In said annexed drawings:

Figure 1 is a central vertical sectional view showing a complete self-contained apparatus having two four-way valves and embodying the principle of the invention;

Figure 2:
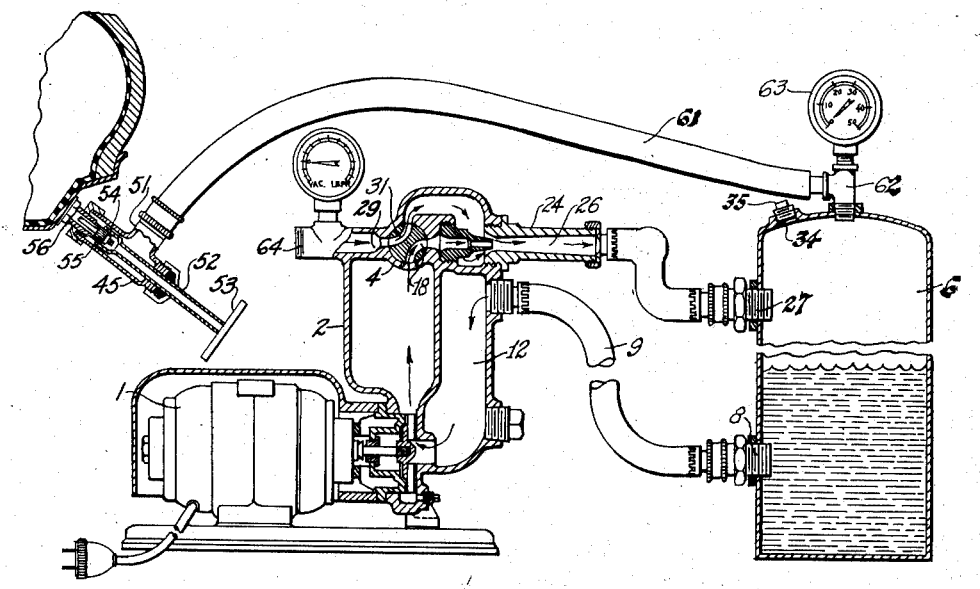
Figure 2 is a view substantially similar to Figure 1, but showing the apparatus in simplified form set up as an air compressor and embodying only one four-way valve.

As shown in Figure 1 of the drawings, the apparatus comprises a motor 1, preferably directly connected with a pump, which, for illustrative purposes, consists of a self-priming centrifugal pump 2, having built-in as an integral structure a fluid jet nozzle, associated with two four-way valves 4, 5, and having fluid conduits, presently to be described, connected with a closed reservoir or tank 6 at one side and connected with a heavy-duty tire 7 at the other side.

The tank 6 has an outlet port 8 below the level of the liquid therein, connected by a supply pipe or conduit 9, with an inlet port 11, in the centrifugal pump casing, whereby liquid may enter the pump chamber 12 on the suction or intake side of the pump and be directed into the eye 13 of the pump impeller 14. The impeller discharges liquid into the main pump chamber 15, which serves also as a pump priming chamber, through a spiral or volute channel 16. The liquid fills the chamber 15 on the output side of the pump 2 and enters the outlet port 17 formed in the casing of a four-way valve 4. As shown in Fig. 1, the valve element 19 of the valve 4 is provided with a channel 18 for connecting the port 17 with an outlet port 21, which is connected to the inner end of the jet nozzle 21a for flow through the reduced passageway of the latter. The outer terminating end of the jet nozzle 21a is positioned centrally of a constricted annular passageway 23 at the inner end of a venturi 24, which is connected to the inner end of a discharge pipe 26, the latter, at its outer end being connected to the tank 6 above the liquid level therein. From the foregoing description it will be observed that I provide a liquid circuit consisting of the pump 2, the liquid supply connection 9 between the tank 6 below the liquid level therein and said pump and a liquid discharge connection between the outtake of the pump and the tank 6 above the liquid level therein, the discharge connections being provided between the pump and tank with a jet nozzle in operative relation to a venturi. The action of the jet nozzle 21a will carry fluid entrained at the annular passageway 23 through the diverging discharge portion of the venturi to its outlet 25 and through the conduit 26 to the liquid inlet port 27 of the tank 6. On entering the tank entrained air or gas will separate from the liquid, which falls to the lower portion of the tank and is again drawn into the centrifugal pump through the supply pipe or conduit 9, as the cycle is carried on continuously during the pumping operation in the direction stated. I provide fluid flow connections between the tire 7 and tank 6, whereby the tire 7 may be evacuated of air, liquid or air under pressure may be supplied to the tire and later the liquid may be removed from the tire and the latter re-inflated; these connections consist of a fitting 43 having a passageway 43a, the inner end of which is connected through a four-way valve 5 with the adjacent end of the main conduit 28a. The main conduit 28a extends to the venturi 24 and discharges the liquid or air in the annular passageway 23. The fluid pumped from the tire into the tank 6 is supplied to the jet nozzle through the port 28 at the top of the pump casing and passes through a main conduit 28a and the port 29 and thence through the channel 31 of the four-way valve 4 and the port 32 into the passageway 33 leading to the annular passageway 23 of the venturi, for flow to the tank 6. The outer end of the passageway 43a through the fitting 43 is connected to the inner end of a separate conduit 44, the outer end of which is adapted to be connected to the tire 7. Air under pressure in the tank 6 is supplied to the tire 7 by an air supply pipe 37, which extends from the tank 6 above the liquid level therein to the valve 5 for connection to the inner end of the passageway 43a through the fitting 43. As shown in Fig. 1, the casing of the valve 5 is formed with a port 48 which is open to the atmosphere, a port 41 to which the outer end of the air supply pipe 37 is connected, a port 47 to which the inner end of the passageway 43a is connected and a port 28 to which the adjacent end of the main conduit 28a is connected. Fig. 1 shows the positions of the valve elements 19 and 5a of the valves 4, 5, to provide for the flow of liquid or air, due to the action of the jet nozzle 21a, incident to the operation of the pump 2 and circulation of liquid from the tank 6 into the latter as already set forth, the flow of air or liquid being through the separate conduit 44, passageway 43a, port 47, channel 5' of valve element 5a, port 28, main conduit 28a to annular passageway 23, venturi 24 and pipe 26 to the tank 6. Where liquid is to be supplied to the tire 7, the valve element 19 of valve 4, which is common to the outtake of the pump 2 and main conduit 28a, is adjusted or rotated to its other position (see Fig. 4), whereby flow of liquid from the pump and air through the main conduit 28a are cut off and the liquid from the outtake side of the pump 2 is directed into the main conduit 28a for flow therethrough, channel 5' of valve element 5a, passageway 43a and separate conduit 44 to the tire 7. Where pressure air is to be supplied through pipe 37 and passageway 43a to the tire 7, the valve element 19 of the valve 4 is positioned as shown in Fig. 1, whereas the valve element 5a is rotated to its other position; that is, channel 5' connects port 41 with port 47 to connect the air supply pipe 37 with the passageway 43a, whereby the air is supplied to the tire, and channel 42 connects the port 48 with the port 28, whereby the jet nozzle 21a is effective to induce air flow through the main conduit 28a to the tank 6.

It will be noted that the pump and tank assembly forms a closed circuit, and that air pressure developed within the tank supplies water under pressure to the centrifugal pump which adds this pressure to the impeller developed pressure thus building up, on a feed-back principle, a high degree of pressure and resultant high velocity at the jet nozzle, with the development of still more air pressure within the tank.

Thus the above arrangement is similar to a multi-stage centrifugal pump in that the total pressure existing in the main pump chamber outlet port 17 is the sum of the pressure in the tank 6 plus the pressure developed by the centrifugal pump impeller 14. Another advantage resides in the fact that a fixed quantity of liquid is used over and over in operating the jet pump instead of operating on new liquid continuously entering the pump and with the discharge of such liquid as waste.

The tank 6 is fitted with a filling opening 34 adapted to be closed by a plug 35 thus permitting the pumping system to be supplied with the necessary amount of liquid prior to operating the apparatus. The top of the tank 6 is fitted with a threaded port 36 to which is connected the compressed air conduit 37 by means of a suitable fitting 38. The outer end of the separate conduit 44 is removably connected with the tire valve enclosing fitting 45. The fitting 43 supports a combination pressure and vacuum gauge 46 whereby the air pressure supplied to and through the separate conduit 44 as herein described to the interior of the tire to inflate the same with air or to add air above the liquid previously introduced into the tire as ballast, may be observed. During the operation just described, the valve element or plug of the valve 5 will be turned to open position, that is, channel 42 will connect inlet port 41 with fitting 43 and channel 47 will connect port 48 with port 23, forming a continuous passage to provide additional volume of air from the atmosphere. The fitting 45 connecting the separate conduit 44 with the tire 7 preferably consists of an elongated T-shaped housing to the projecting portion 51 of which the pressure line 44 is connected. The main body portion of the fitting 45 receives a tubular stem 52 operated by means of a handle 53. The inner end 54 of the stem 52 engages the valve cap 55 serving to open and close the valve 56 of the tire 7. This fitting thus permits the full withdrawal of the valve cap from the valve and provides a large area for the entrance of fluids such as compressed air or liquid into the tire.

As has been explained, when the vehicle intended for heavy-duty earth-moving service or the like is to have its tire ballasted with liquid, the first step in the operation comprises the removal of the air from the tire and the four-way valves 4, 5, of the apparatus are then adjusted in the manner shown in Fig. 1, the upper portion of the tank being open to the atmosphere through port 48 and the air in the tire communicating through the valves 5 and 4 with the jet nozzle 22, the air in the tire may thus be rapidly exhausted from the interior thereof.

Figure 4:
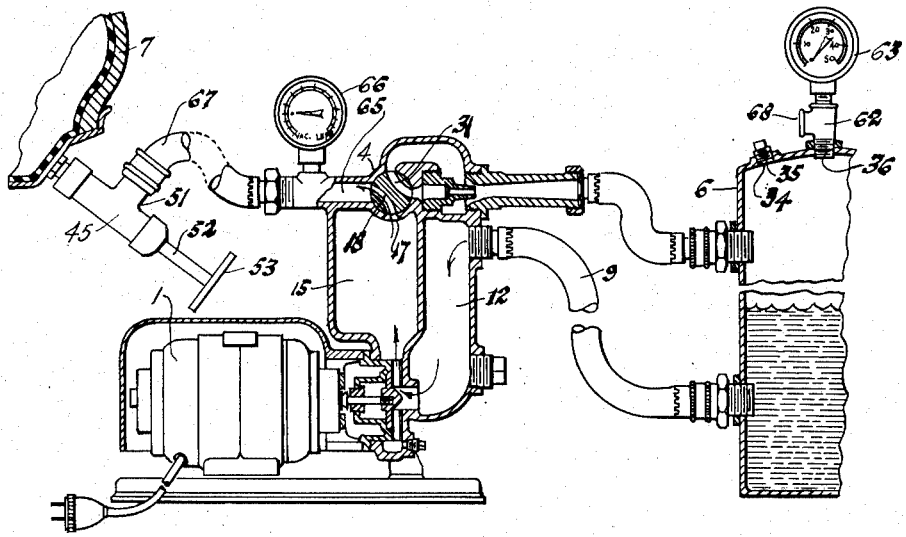
Figure 4 is a view similar to Figures 2 and 3, but showing the apparatus set up for liquid filling of a container.

When the gauge 46 shows a suitable degree of low pressure within the tire the valve 4 is turned to the position shown in Figure 4 and the centrifugal pump is thus cut off from the jet nozzle and the liquid within the main pump chamber 15 is forced into and through the main conduit 28a, channel 5' of the valve 5 and through the fitting 43 and the conduit 44 and the fitting 45 into the tire 7. When the desired amount of liquid has been pumped into the tire 7 the valve element 5a of the valve 5 is turned to have its passageway 42 connecting the conduit 37 with the passageway 43a of the fitting 43. The passageway 5' of the valve 5 will then be in position to draw air through the port 48 and thence through the channel 31 of the valve 4 and through the annular passageway 23 adjacent the jet nozzle and thus air will be drawn from the outside atmosphere and forced into the tank 6, causing pressure air to flow through conduit 37 into the tire 7 through the connections heretofore described. In this manner air pressure will be supplied to the tire above its liquid contents, thereby providing a suitably ballasted tire with an adequate degree of resiliency to travel over a rough surface.

When the heavy duty service of the apparatus is completed and it is desired to repair or change a tire or to condition the tire for working on very soft ground, the connections of the apparatus are arranged to withdraw liquid from the tire and return the same into the tank. The position of the valves is then arranged as shown in Figure 1 and the liquid will be withdrawn from the tire through the jet action of the jet nozzle 22, the pressure air in the tank being vented at such time through the conduit 37 into the discharge port 48 of the valve 5.

As has been explained, a simplified form of apparatus may be used by cutting off the air or liquid flow in the main conduit 28a to the tank 6 and jet nozzle 21a and adjusting the four-way valve 4 to control the direction of liquid flow into the main conduit 28a. The apparatus shown in Figures 2, 3, and 4 includes many of the parts shown in Figure 1 and the same reference characters have been used for like parts. These figures show the connections required for setting up the device as an air compressor in Figure 2 and as a fluid exhauster in Figure 3, and for liquid inflation or filling of the tire in Figure 4. As shown in each of these views the second four-way valve 5 is omitted from the construction. As shown in Figure 2 the conduit 61 is connected with a fitting 62, which is connected with the tank 6 and also with the pressure gauge 63. When carrying compressed air the conduit 61 is connected with the extension 51 on the fitting 45 and the plug of the valve 4 is adjusted, as shown in Figure 2, in a position to draw air from the atmosphere through the port 64 and thence to the annular passageway of the venturi 24 and through the conduit 26 to the tank 6. Pressure will thus be rapidly built up within the tank and the degree of pressure supplied to the tire, will be noted on the gauge 63.

Figure 3:
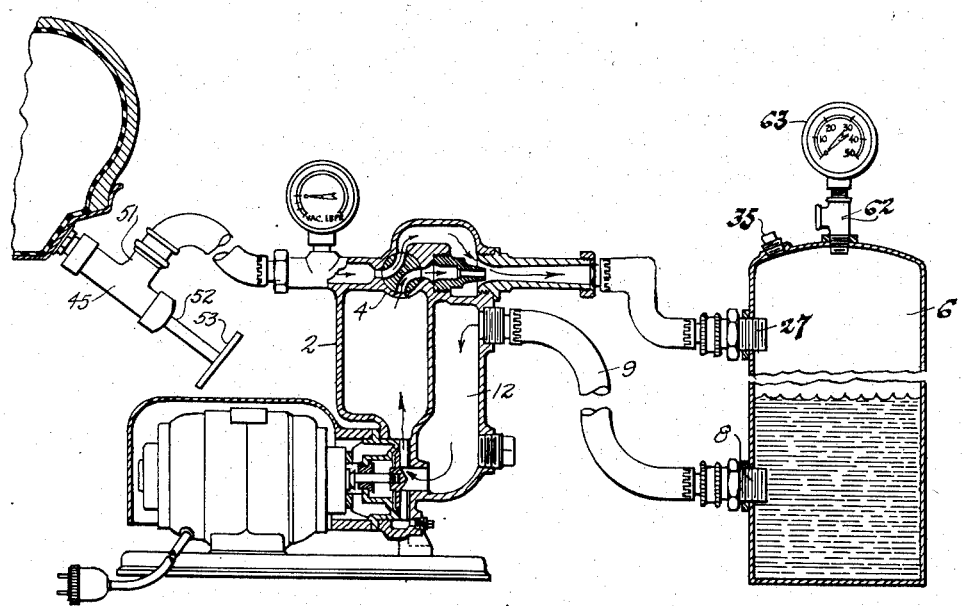
Figure 3 is a view similar to Figure 2 showing the apparatus set up as a fluid exhauster.

When it is desired to supply ballast to tire 7, the air within the same must first be withdrawn and the apparatus is then connected to the tire in the manner shown in Figure 3. When exhausting the air from the tire the apparatus may be arranged in the manner shown in Figure 1 or in Figure 3 in each of which cases the tank is vented to the atmosphere and the jet nozzle has no back pressure to contend with in exhausting the air from the tire. After an adequate degree of low pressure has been produced in the tire, the apparatus is set up in the manner heretofore described in connection with Figure 1 to deliver liquid to the tire, or in the manner shown in Figure 4.

It will be noted that the channel 18 of the valve 4 is directly connected with the main pump chamber through the port 17 and leads into the passageway 65 (Fig. 4). The conduit 67 connects the passageway 65 with the fitting 45, which is connected with the valve of the tire 7. The valve 4 when turned into position indicated has the passageway 31 short-circuiting the jet nozzle which is thus made inactive. It will be noted that the fitting 62 above the tank is in direct communication with the outside atmosphere through the port 68. When the apparatus is arranged as shown in Figure 4 liquid will be withdrawn from the tank 6 by means of the centrifugal pump and discharged through the valve 4 and conduit 67 and fitting 45 into the tire 7. When the requisite degree of liquid has been supplied to the tire, the residual amount of air found desirable to carry above the ballast liquid may be introduced by setting the valves and connections as shown in Figure 2 and heretofore described at detail. As soon as the desired air pressure is thus placed in the tire above the liquid the tire valve 45 may be reseated and the apparatus detached from its valve connection with the tire.

As we have indicated, where highway transportation is in view it is desirable to remove the ballast liquid from the vehicle tires and the procedure involves the use of the device as a fluid exhauster set up in the manner shown in Figure 3 followed by an inflation of the tire with compressed air by use of the apparatus in the manner disclosed in Figure 2.

Figure 5:
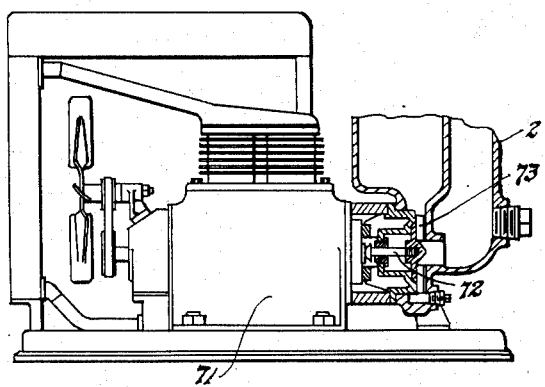
Figure 5 is a fragmentary side elevation, partly in section, showing a gas engine in direct connection with the impeller of a centrifugal pump as the power source for operating the apparatus as a fully portable self-contained independent unit.

The apparatus may be permanently set up at a gasoline filling station or may be made portable so that it can be transported to various localities where ballast liquid has to be supplied to earth-moving equipment and the like. In many of the places where such equipment is in use there is no available source of electricity so that the use of an electric motor such as is shown in Figures 1 to 4, inclusive, is impracticable. In such case the apparatus may take the form shown in Figure 5 wherein a conventional gasoline engine 71 has its shaft 72 directly connected with an impeller 73 of the centrifugal pump 2 heretofore described and having the connections illustrated in Figures 1 to 4, inclusive, respectively. This combination of a self-contained source of power with the self-contained air and liquid handling apparatus permits the ballasting of equipment in the field. Where a large number of vehicles is to be supplied, it is necessary to have an enlarged tank 6 to carry an adequate supply of liquid to ballast the tires of all of the wheels of the vehicles used in a particular field of operation.

As has been stated, the apparatus has been described in connection with the ballasting of the tires of heavy-duty vehicles, particularly those utilized for earth-moving operations. It is to be understood, however, that the apparatus as a whole and certain features thereof in particular have a broader field of application than that described in detail. This is particularly true in relation to the multi-stage pump action made availble through the use of a jet nozzle in a closed liquid circuit of a centrifugal pump and fluid pressure tank. As has been indicated, the relative size of the tank to the pump may be greatly varied and, of course, when it is used solely as a fluid pressure multiplying means it may be relatively small, whereas where it is to carry the liquid necessary to supply a large number of vehicles the tank must be of large capacity.

Thus the steps just recited comprise a novel method of filling and weighting tires and conserving and storing the ballast material. The method includes the series of steps wherein the liquid utilized for ballasting the tires may be withdrawn and stored in a closed reservoir until again required for ballasting.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:

1. In apparatus of the class described, the combination of a reservoir adapted to receive and store air and liquid, a circuit for liquid connected to said reservoir above and below the level of the liquid therein, said circuit including a centrifugal pump for drawing liquid from said reservoir and discharging it into said reservoir above the liquid level therein and a jet nozzle between said pump and the discharge connection of said circuit with said reservoir, an air discharge line connected at its inner end with the upper portion of said reservoir, a separate circuit having connection at its inner end with said liquid circuit adjacent said jet nozzle for supplying fluid thereto, a fitting having a flow line adapted to be connected to a container and a port open to the atmosphere, a four-way valve common to said fitting, said port and the outer ends of said separate circuit and air discharge line, said valve when in one position serving to connect said fitting with said separate circuit, whereby said jet nozzle induces fluid flow in said separate circuit to withdraw fluid from the container, and in another position serving to connect said air discharge line with said fitting, whereby the container is supplied with air, and a valve in said liquid and separate circuits between said pump and said jet nozzle and arranged to cut off flow therethrough to said reservoir and connect said liquid circuit with said separate circuit, whereby, when said four-way valve is in said first mentioned position, liquid may be circulated by said pump from said reservoir through said separate circuit and fitting to the container.

2. In apparatus of the class described, the combination of a reservoir adapted to receive and store air and liquid, a circuit for liquid connected to said reservoir above and below the level of the liquid therein, said circuit including a centrifugal pump for drawing liquid from said reservoir and discharging it into said reservoir above the liquid level therein, and a jet nozzle between said pump and the discharge connection of said circuit with said reservoir, an air discharge line connected at its inner end with the upper portion of said reservoir, a separate circuit having connection at its inner end with said liquid circuit adjacent said jet nozzle for supplying air thereto, a fitting connected to the outer end of said air discharge line and adapted to be connected to a container, and means for supplying air to the outer end of said separate circuit.

3. A method of filling and weighting tires of earth-working equipment, which consists in withdrawing air from within a tire to be weighted, then supplying liquid under pressure into the tire space vacated by the air to a degree of less than full capacity thereof, and finally supplying air under pressure into the tire space to inflate the tire to a predetermined pressure.

4. An apparatus providing a tank for receiving and separating air and liquid under pressure, a fluid system including a pump, fluid connections between said pump and said tank above and below the level of the liquid in said tank, the connection with said tank above the liquid level therein being provided with a jet nozzle, a fitting adapted to be connected with a container, a connection for air between the top of said tank and said fitting, a separate connection for air or liquid extending from said fitting to said jet nozzle, and separately operable valves in said connections for controlling the flow of air or liquid selectively, under the influence of said pump, into and out of said tank and out of and into the container, respectively.

5. A method of pumping air and liquid employing a closed container partially filled with liquid and a separate container, which includes the steps of circulating liquid from and to the closed container and simultaneously increasing the pressure of the air and liquid therein and separating the liquid from the air, partially filling the separate container with liquid, and finally transferring the compressed air to the separate container.

6. A unitary apparatus for evacuating air from a container and filling the same with liquid and air under pressure, comprising a tank for holding a body of liquid, a pump, liquid connections between said tank below the liquid level therein and the intake of said pump and liquid discharge connections between the outtake of said pump and said tank above the liquid level therein, a jet nozzle and a venturi operatively related to said nozzle, interposed in said discharge connections, a four-way valve having an air intake port, a main conduit for liquid or air between a second port of said valve and said venturi, an air supply pipe between said tank above the liquid level therein and a third port of said valve, a separate conduit for liquid or air connected at one end to a fourth port of said valve and adapted to be connected at its other end to a container, and a separate valve in and common to said discharge connections and said main conduit, said valves when in one position, serving to connect the separate conduit to said main conduit and outtake of said pump with said jet nozzle and said main conduit to said venturi, whereby air or liquid in the container may be discharged into said tank, and when said separate valve is in its other position, with said first mentioned valve in said first mentioned position, said main conduit and outtake from said pump are cut off from said venturi and said nozzle, respectively, and the pump outtake is connected to said main conduit to supply liquid thereto and through said first mentioned valve and said separate conduit to the container, and when said first mentioned valve is in its other position, with said separate valve in its first mentioned position, said air intake port is connected to said main conduit for air flow to and through said venturi to said tank and said air supply pipe is connected to said separate conduit for supplying air under pressure to the container.

7. A unitary apparatus for evacuating air from a tire on the wheel for a vehicle and filling the same with liquid and pressure air comprising a reservoir adapted to receive and store air and liquid, a circuit for the liquid consisting of a pump, a liquid supply connection between said reservoir below the liquid level therein and the intake of said pump and a liquid discharge connection between the outtake of said pump and said reservoir above the liquid level therein, said discharge connection being provided intermediate its ends with a jet nozzle, a valve provided with a valve element, a main conduit for liquid or air connected at one end with one port of said valve and at its other end with said discharge connection outwardly of said jet nozzle, a second conduit for liquid or air connected at one end to a second port of said valve and adapted to be connected at its other end to the tire, an air supply pipe connected at one end to said reservoir above the liquid level therein and at its other end to a third port of said valve, the valve element of said valve being arranged to selectively control the flow of liquid or air through said valve and through said second conduit into the tire or from the tire through said second conduit and valve to said main conduit, and a separate valve having a valve element for selectively disconnecting said main conduit from said discharge connection between said outtake of said pump and said reservoir and connecting the outtake of said pump to said main conduit for supplying liquid to the latter.

8. An apparatus of the class described comprising a tank for receiving and separating air and liquid, a fluid system consisting of a pump, a liquid supply connection between said tank below the liquid level therein and the intake of said pump, a discharge connection between the outtake of said pump and said tank above the liquid level therein, a jet nozzle and a Venturi tube associated therewith, mounted in said last mentioned connection, a fitting having a flow connection for liquid or air adapted to be connected with a container, a conduit for liquid or air between said fitting and said discharge connection outwardly of said venturi, and a valve arranged to selectively connect the outtake of said pump with said discharge connection inwardly of said jet nozzle or with said conduit.

9. An apparatus for removing gas or liquid from a container and resupplying gas or liquid thereto, comprising a closed reservoir adapted to be partially filled with liquid, a pump, a liquid supply pipe between said reservoir below the liquid level therein and the suction side of said pump, a liquid discharge connection between the output side of said pump and said reservoir above the liquid level therein, said discharge connection intermediate the output side of said pump and said reservoir being provided with a jet nozzle and Venturi assembly, a four-way valve having a valve element, one port of said valve being open to the atmosphere, a main conduit connected at one end with a second port of said valve and at its other end with said venturi, an air supply pipe connected at one end to a third port of said valve and at its other end with said reservoir above the level of the liquid therein, a separate conduit adapted to be connected at one end to a container and at its other end to a fourth port of said valve, a separate valve having a valve element formed with a through channel to control the flow of liquid from the output side of said pump to said jet nozzle or to said main conduit and a separate channel to control the flow of gas or liquid from said main conduit to said venturi, and power means for driving said pump, the valve elements for said valves when in one predetermined relation thereof being arranged to connect said main conduit with said venturi and the output side of said pump with said jet nozzle, whereby liquid is circulated from said reservoir through said supply pipe to and through said discharge connection to said reservoir above the liquid level therein and simultaneously said jet nozzle induces flow of gas or liquid from the container through said separate conduit, and said main conduit and said separate channel of said separate valve to said venturi for supply of the gas or liquid to said reservoir and said valve elements when in another predetermined relation thereof being arranged to cut off flow of gas or liquid through said separate conduit, said main conduit and said separate channel of said separate valve to said venturi and to connect the output side of said pump with said main conduit for liquid flow through said main conduit to and through said separate conduit to the container and said valve elements when in another predetermined relation thereof being arranged to cut off said separate conduit and connect said first mentioned port with said main conduit and to connect said main conduit with said venturi and the output side of said pump with said jet nozzle for inducing flow of air to and storing the air under pressure in said reservoir and connect said air supply pipe to said separate conduit for supply of air to said container.

WARREN E. RUPP.

References Cited in the file of this patent

UNITED STATES PATENTS

| Number | Name | Date |
|---|---|---|
| 118,472 | Munzinger | Aug. 29, 1871 |
| 2,415,019 | McMahan | Jan. 28, 1947 |
| 2,424,285 | Piccardo et al. | July 22, 1947 |
| 2,537,266 | Granberg | Jan. 9, 1951 |